(12) United States Patent
Offen et al.

(10) Patent No.: US 11,418,554 B2
(45) Date of Patent: Aug. 16, 2022

(54) SYSTEMS AND METHODS FOR DYNAMIC MEDIA CONTENT STREAMING

(71) Applicant: Spotify AB, Stockholm (SE)

(72) Inventors: Shana Offen, Ossining, NY (US); David Saverio Susi, Brooklyn, NY (US); Aron Patrick Glennon, Cape Elizabeth, ME (US); Aarshay Jain, Jersey City, NJ (US); Yi Yuan, Jersey City, NJ (US); Lan Xu, Jersey City, NJ (US); Yin Kwan Chung, New York, NY (US); Gautham Padmanabhan Nair, New York, NY (US); Jiming Shi, Princeton, NJ (US); Raj Kumar Rajendran, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/932,478

(22) Filed: Jul. 17, 2020

(65) Prior Publication Data

US 2022/0021718 A1    Jan. 20, 2022

(51) Int. Cl.
*H04L 29/06*    (2006.01)
*H04L 65/61*    (2022.01)
(52) U.S. Cl.
CPC ................ *H04L 65/4069* (2013.01)
(58) Field of Classification Search
CPC ...... H04L 65/4069; H04L 51/32; H04L 51/08
See application file for complete search history.

(56) References Cited

U.S. PATENT DOCUMENTS

| 2008/0307454 | A1* | 12/2008 | Ahanger | G06Q 30/02 |
| | | | | 725/36 |
| 2015/0350275 | A1 | 12/2015 | Sanghavi et al. | |
| 2016/0189223 | A1 | 6/2016 | McLeod et al. | |
| 2018/0376178 | A1 | 12/2018 | Cormican | |
| 2019/0289368 | A1 | 9/2019 | Redmond et al. | |

OTHER PUBLICATIONS

Spotify AB, Extended European Search Report, EP21186130.7, dated Dec. 16, 2021, 10 pgs.

* cited by examiner

*Primary Examiner* — Glenford J Madamba
(74) *Attorney, Agent, or Firm* — Morgan, Lewis & Bockius LLP

(57) ABSTRACT

A method performed at a server system includes providing to a device a media content item included in a listening session. The method includes receiving from the device characteristics of the listening session corresponding to a first time and determining, based on the characteristics, a default decision as to whether to provide a media content clip after the media item. The method includes receiving characteristics of the listening session corresponding to a second time and initiating a determination of a first decision as to whether to provide the media content clip after the media item. In accordance with the first decision being reached within a latency period, the media content clip is provided in accordance with the first decision. In accordance with the latency period being lapsed without the first decision being reached, the media content clip is provided in accordance with the default decision.

19 Claims, 10 Drawing Sheets

Listening Session (time)

600

> At a server system (602) of a media-providing service.

Provide (604), to a first electronic device corresponding to a user of the media-providing service, a first media content item for playback.

> The first media content item is included (606) in a listening session of the user.

> The listening session of the user includes (608) a first set of media content items provided to the first electronic device sequentially.

> The first set of media content items includes (610) audio content items.

> Create (612), while providing the playback of the first media content item, a list of media content clips including the first media content clip.

> The list of media content clips is associated (614) with the user and the list of media content clips includes media content clips to be provided to the first electronic device in a particular order.

> Update (616) the list of media content clips periodically while providing the playback of the first media content item.

Figure 6A

SYSTEMS AND METHODS FOR DYNAMIC MEDIA CONTENT STREAMING

TECHNICAL FIELD

The present disclosure generally relates to media playback. In particular, the present disclosure relates to methods and systems for dynamic media content streaming. The disclosed embodiments relate generally to media playback, and, in particular, to systems and methods for providing playback of a media content item including additional media content clip(s).

BACKGROUND

Access to electronic media, such as music, videos, podcast, and audiobook content, has expanded dramatically over time. As a departure from physical media, media content providers stream media to electronic devices across wireless networks, improving the convenience with which users can digest and experience such content.

Generally, a listening session will include media content items (e.g., audio content items) as well as additional media content clips. For example, the additional media content clips may be sponsored content. The additional media content clips are conventionally scheduled to be provided at preset times (e.g., media content breaks) and interrupt the listening session.

SUMMARY

It is in view of the above considerations and others that the various embodiments disclosed herein have been made. The present disclosure recognizes the fact that there still exists a need for improved methods, server systems and related computer program products for media content streaming.

For example, the present disclosure recognizes the fact that media content clips are conventionally scheduled to be provided at preset times (e.g., media content breaks). The media content breaks thus interrupt the listening session. Since the media content clips are conventionally scheduled to be provided at preset times, the inventors have realized that the corresponding media content breaks are provided in a static manner. If provided too frequently, with too long duration, or with too many media content clips adjacent to each other, such media content breaks may reduce the user's enjoyment of the listening session.

It is therefore a general object of embodiments disclosed herein to provide a more dynamic provision of the media content clips when a listening session is to include media content items (e.g., songs) as well as additional media content clips. In particular, it would be advantageous if embodiments disclosed herein allow for providing additional media content clips (e.g., sponsored content items) to a user for playback in a more adaptive or otherwise customized manner.

This general object has been addressed by the appended independent claims. Advantageous embodiments are defined in the appended dependent claims.

The present disclosure provides methods for dynamically adjusting the when, what, and how of providing media content clips (e.g., media content breaks) in a streaming listening session. For example, the methods disclosed herein provide dynamic adjustments as to when to provide media content clips, the duration of the media content clip, and/or the content of the media content clip. In some embodiments, a decision as to whether to provide additional content (e.g., sponsored content) is initiated just before a song ends (e.g., a decision is initiated just before each song ends). The decision is based on the current context of the user at that moment, and may include a prediction of the remaining length of the listening session and/or an indication of whether the user is in an interactive state (e.g., looking at their device and thus capable of interacting with sponsored content). For example, when a long listening session is predicted, it may not be necessary to provide media content breaks as frequently (e.g., the media content breaks can be spaced out, while still exposing the user to the desired amount of additional media content).

In accordance with some embodiments, a method is performed at a server system associated with a media-providing service. The server system has one or more processors and memory storing instructions for execution by the one or more processors. The method includes providing, to a first electronic device corresponding to a user of the media-providing service, a first media content item for playback. The first media content item is included in a listening session of the user. After the first electronic device has initiated playback of the first media content item, the method includes, at a first predetermined time with respect to the end of the first media content item, receiving, from the first electronic device, one or more characteristic of the listening session of the user corresponding to the first predetermined time. The method includes determining, based at least in part on the one or more characteristics of the listening session of the user corresponding to the first predetermined time, a default decision as to whether to provide a first media content clip after the end of the first media item. The method includes, at a second predetermined time with respect to an end of the first media content item, receiving, from the first electronic device, one or more characteristics of the listening session of the user corresponding to the second predetermined time. The second predetermined time is after the first predetermined time. The method includes initiating a determination, based at least in part on the one or more characteristic of the listening session of the user corresponding to the second predetermined time, of a first decision as to whether to provide the first media content clip after the end of the first media item. In accordance with the first decision being reached within a predetermined latency period, the method includes providing the first media content clip to the first electronic device in accordance with the first decision. In accordance with a determination that the predetermined latency period has elapsed without the first decision being reached, the method includes providing the first media content clip to the first electronic device in accordance with the default decision.

In accordance with some embodiments, a server system has one or more processors and memory storing instructions for execution by the one or more processors. The instructions include instructions for providing, to a first electronic device corresponding to a user of the media-providing service, a first media content item for playback. The first media content item is included in a listening session of the user. After the first electronic device has initiated playback of the first media content item, the instructions include instructions for, at a first predetermined time with respect to the end of the first media content item, receiving, from the first electronic device, one or more characteristics of the listening session of the user corresponding to the first predetermined time. The instructions also include instructions for determining, based at least in part on the one or more characteristics of the listening session of the user corresponding to the first predetermined time, a default decision as to whether to provide a first media content clip after the end of the first media item. At a second predetermined time with respect to an end of the first media content item, where the second predetermined time is after the first predetermined time, the instructions include instructions for receiving, from the first electronic device, one or more characteristic of the listening session of the user corresponding to the second predetermined time. The instructions include instructions for initiating a determination, based at least in part on the one or more characteristic of the listening session of the user corresponding to the second predetermined time, of a first decision as to whether to provide the first media content clip after the end of the first media item. In accordance with the first decision being reached within a predetermined latency period, the instructions include instructions for providing the first media content clip to the first electronic device in accordance with the first decision. In accordance with a determination that the predetermined latency period has elapsed without the first decision being reached, the instructions include instructions for providing the first media content clip to the first electronic device in accordance with the default decision.

In accordance with some embodiments, a computer program product stores instructions that, when executed by a server system, cause the server system to provide, to a first electronic device corresponding to a user of the media-providing service, a first media content item for playback. The first media content item is included in a listening session of the user. After the first electronic device has initiated playback of the first media content item, the instructions cause the server system to, at a first predetermined time with respect to the end of the first media content item, receive, from the first electronic device, one or more characteristic of the listening session of the user corresponding to the first predetermined time. The instructions cause the server system to determine, based at least in part on the one or more characteristic of the listening session of the user corresponding to the first predetermined time, a default decision as to whether to provide a first media content clip after the end of the first media item. At a second predetermined time with respect to an end of the first media content item, where the second predetermined time is after the first predetermined time, the instructions cause the server system to receive, from the first electronic device, one or more characteristic of the listening session of the user corresponding to the second predetermined time. The instructions cause the server system to initiate a determination, based at least in part on the one or more characteristic of the listening session of the user corresponding to the second predetermined time, of a first decision as to whether to provide the first media content clip after the end of the first media item. In accordance with the first decision being reached within a predetermined latency period, the instructions cause the server system to provide the first media content clip to the first electronic device in accordance with the first decision. In accordance with a determination that the predetermined latency period has elapsed without the first decision being reached, the instructions cause the server system to provide the first media content clip to the first electronic device in accordance with the default decision.

A carrier comprising the computer program product described above may also be provided. In some embodiments, the carrier may be a non-transitory computer-readable storage medium. Alternatively, the carrier may be one of an electronic signal, an optical signal, or a radio signal.

Compared with the existing art, the various embodiments described herein enable a more dynamic provision of the media content clips when a listening session is to include media content items (e.g., songs) as well as additional media content clips. For example, embodiments described herein may allow for dynamically adjusting the when, what, and how of providing media content clips (e.g., media content breaks) in a streaming listening session. For example, the when, what, and how of providing media content clips (e.g., media content breaks) in a streaming listening session may be based, at least in part of, one or more characteristics and/or parameters associated with a listening session of a user as determined by a server system of a media-providing service.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 6A-6E are flow diagrams illustrating a method of dynamically adjusting delivery of additional media content clips, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
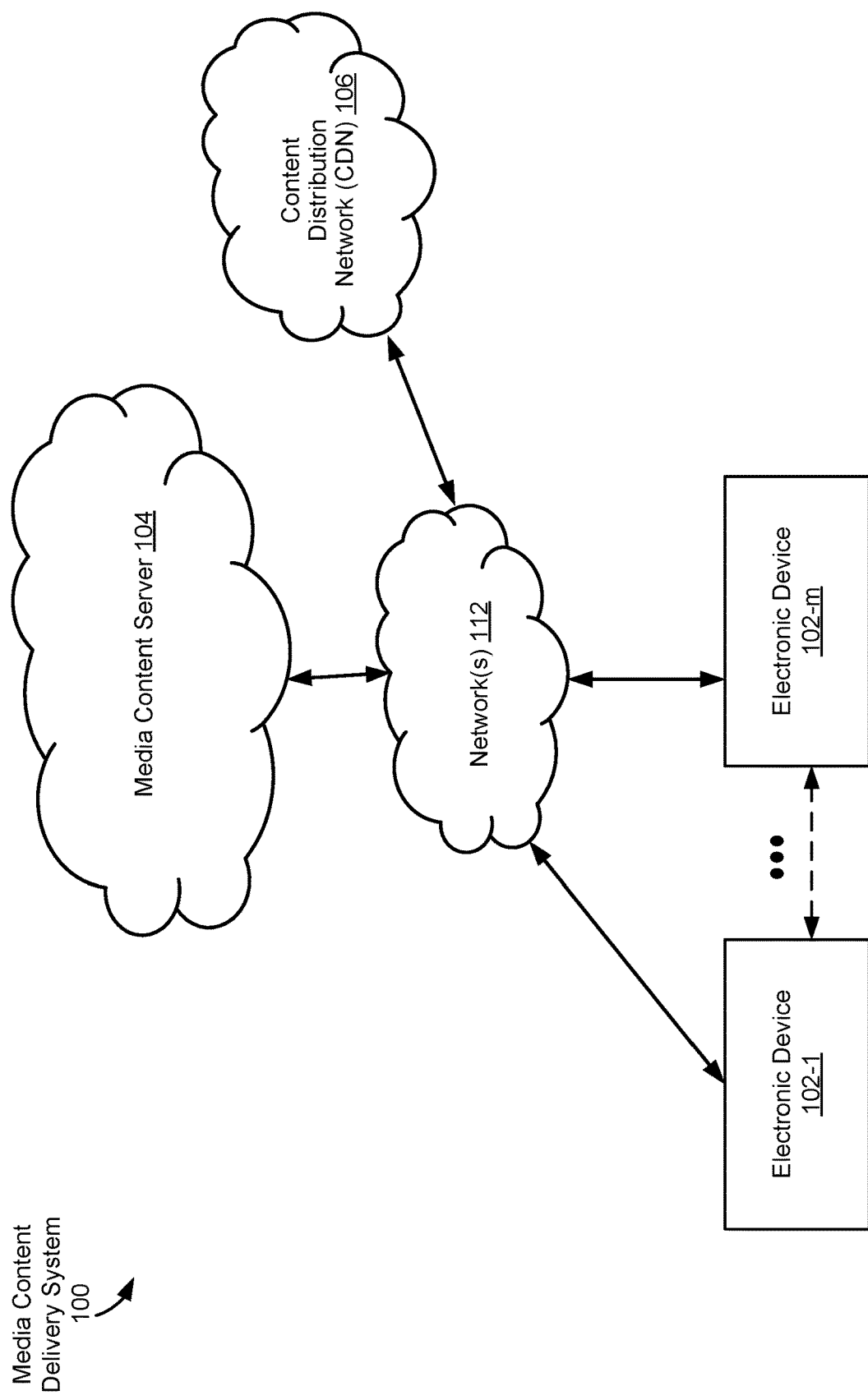
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as audiotracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play audio, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of audio tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. For example, content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "media content items," "audio items," "tracks," and/or "audio tracks").

In some embodiments, media content server 104 receives media requests (e.g., commands) from electronic devices 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
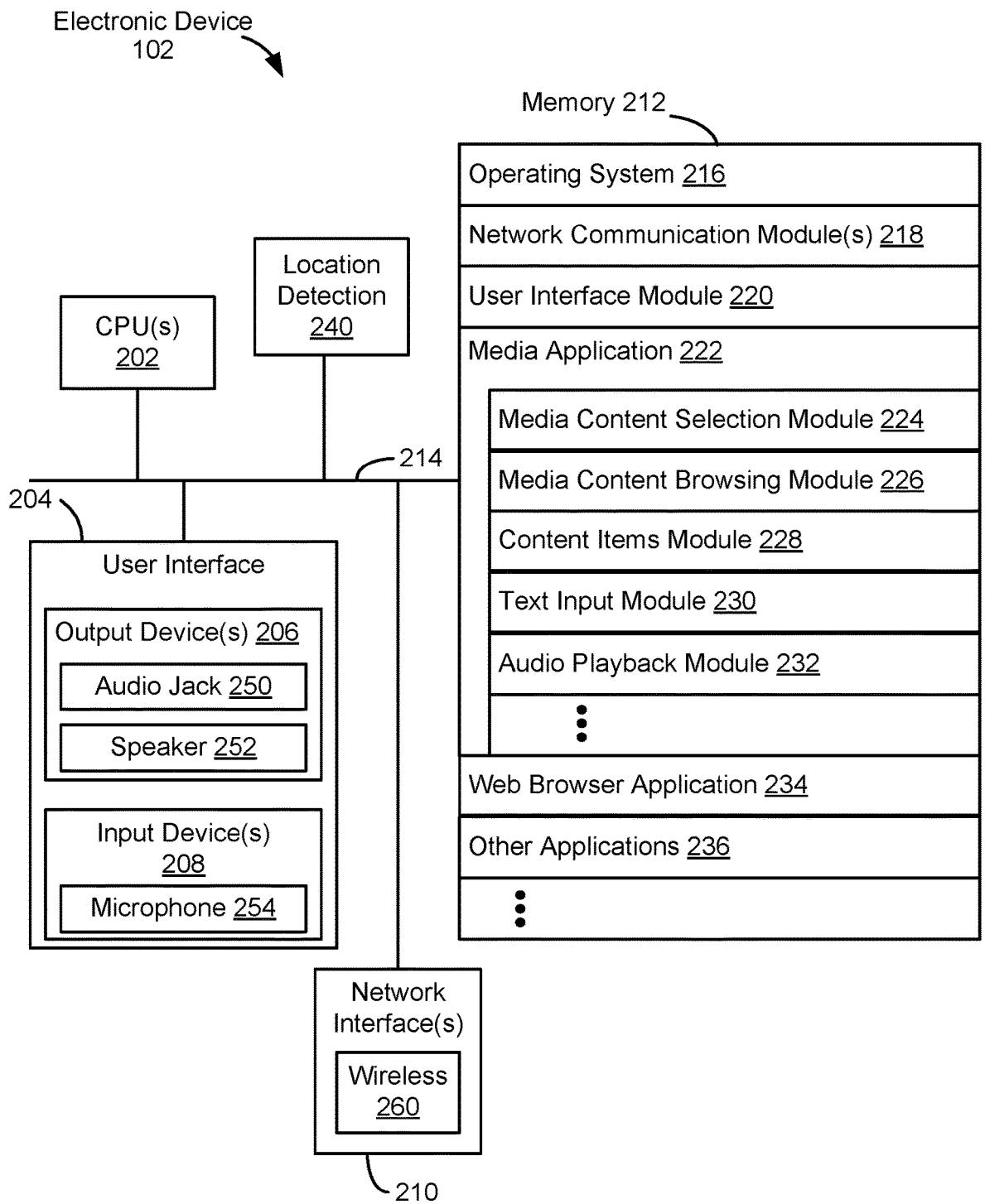
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone 254 and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., other electronic device(s) 102, and/or media content server 104) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

a media content selection module 224 for selecting one or more media content items and/or sending, to the media content server, an indication of the selected media content item(s);

a media content browsing module 226 for providing controls and/or user interfaces enabling a user to navigate, select for playback, and otherwise control or interact with media content, whether the media content is stored or played locally or remotely;

a content items module 228 for processing uploaded media items and storing media items for playback and/or for forwarding to the media content server;

a text input module 230 for providing text sentences (e.g., text strings or text phrases including a plurality of words) to the media content server; and an audio playback module 232 for playing audible versions of the provided text sentences.

a web browser application 234 (e.g., Internet Explorer or Edge by Microsoft, Firefox by Mozilla, Safari by Apple, or Chrome by Google) for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital audio player, a digital video player, 2D gaming, 3D (e.g., virtual reality) gaming, electronic book reader, and/or workout support.

Figure 3:
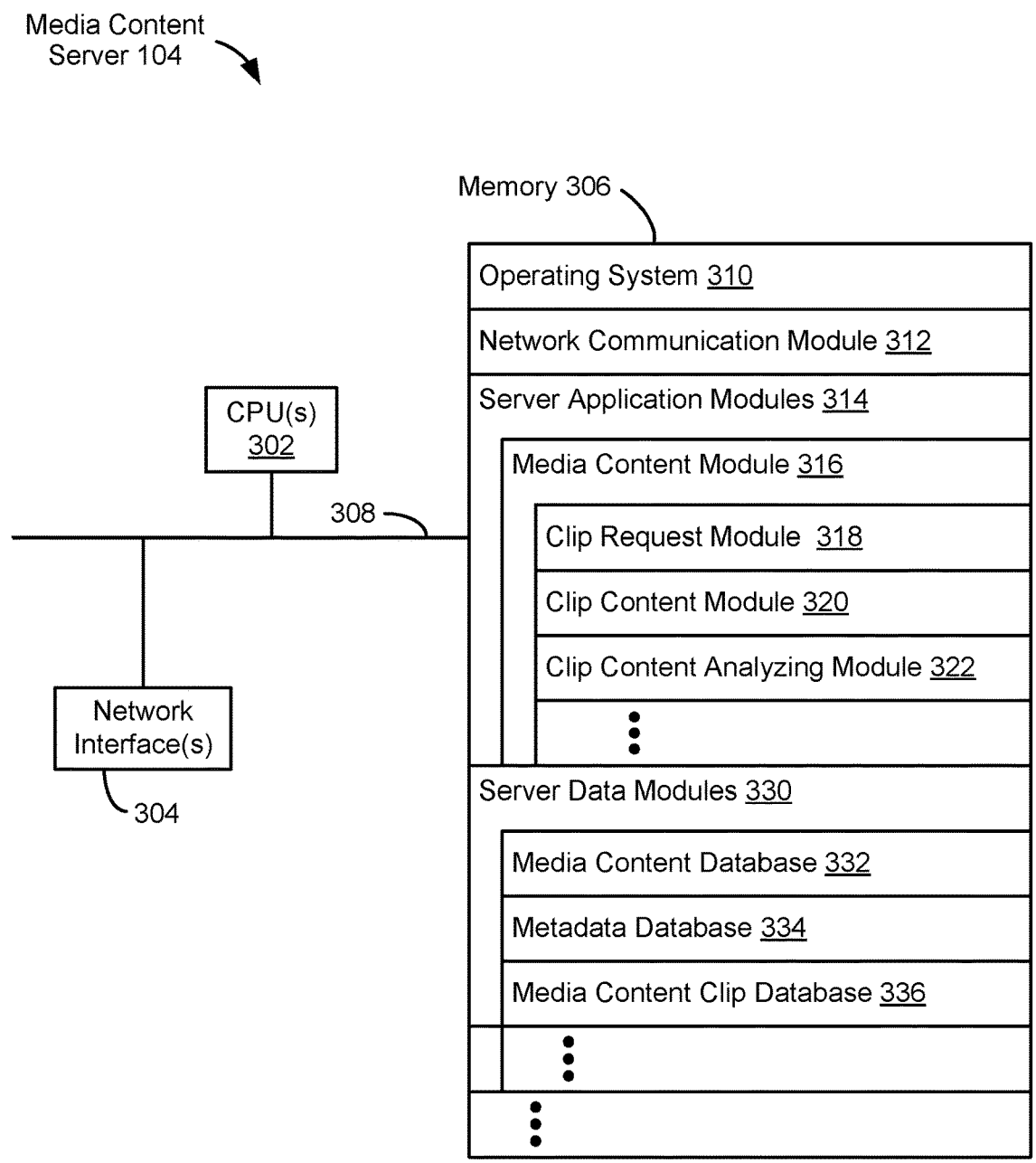
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 including, but not limited to, one or more of:

a media content module 316 for providing media content items, including additional media content clips such as sponsored content to a user (e.g., the electronic device 102), the media content module 316 including, but not limited to, one or more of:

a clip content request module 318 for operating communication for requesting additional media content clips to be presented to a user, and facilitating delivery of the additional media content clips to the user; and a clip content module 320 obtaining and managing a set of additional media content clips to be provided to a user in a particular order; and a clip content analyzing module 322 for processing requests for providing additional content clips and facilitating determining dynamic decisions of providing audio content clips to the user, including applying machine learning to customize time, duration, and content (e.g., a number of sponsored content items included in an sponsored content break) of delivering the additional media content clips;

one or more server data module(s) 330 for handling the storage of and/or access to media items and/or metadata relating to the media items; in some embodiments, the one or more server data module(s) 330 include:

a media content database 332 for storing media items;

a metadata database 334 for storing metadata relating to the media items; and a media content clip database 336 for storing additional media content clips.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores a subset or superset of the respective modules and data structures described with regard to memory 306. In some embodiments, memory 306 stores a subset or superset of the respective modules and data structures described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

As explained above, a technical purpose of the various embodiments described in the present disclosure is to allow for a more dynamic provision of media content clips to a user during a listening session. Embodiments described herein addresses this by suggesting systems and methods for dynamically adjusting decisions of providing media content clips to a user during a listening session. The dynamically adjusting includes determining, e.g., a timing of a media content clip, a duration of the media content clip, and/or the content included in the media content clip (e.g., how many media content clips are included in a single media content break). The methods include receiving and evaluating one or more characteristics of the user's listening session at different times during the listening session and determining, based on the one or more characteristics at the different times, when to provide the additional media content clips. In particular, the procedure seeks to provide the decision regarding whether a media should be provided after playback of a respective media clip using the most up-to-date characteristics of the listening session. The procedure also ensures that no interruptions to the user's streaming arise if the decision is delayed by determining and applying a default (e.g., a fallback) decision in an instance of a delay.

Providing adaptive, or otherwise customized, media content clips is especially important when the user is streaming audio (e.g., non-visual media content items) and the additional media content clip is a video that allows the user to interact with the media content clip. For example, the user could provide a user gesture on the media content clip to connect with a provider of the media content clips, or to learn more about the product featured in the media content clip. It would be beneficial to the provider of the media content clip to provide the media content clip at a time that the user is likely to interact with the media content item.

Figure 4:
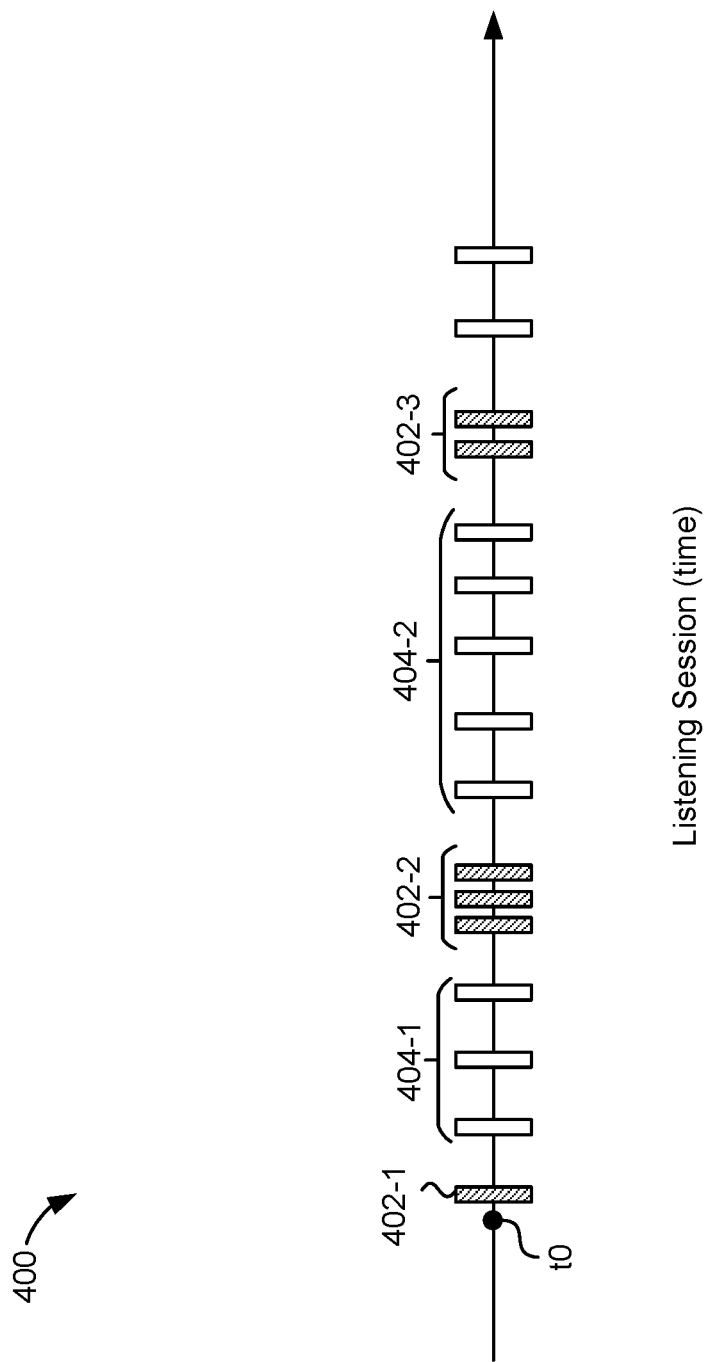
FIG. 4 illustrates a timeline for a listening session, in accordance with some embodiments.

FIG. 4 illustrates a timeline for listening session 400, in accordance with some embodiments. Listening session 400 starts at time t0, when a user initiates streaming music on an electronic device (e.g., electronic device 102 in FIG. 1) from a media content provider (e.g., media content server 104). Listening session 400 includes media content items (e.g., media content items 404) and media content breaks 402.

Note that, as used herein, the term "media content item" is generally used to refer to media content requested by the user (e.g., directly or indirectly, as would be the case for a streaming "radio" station), whereas the term "media content clip" is used to refer to media content not requested by the user (e.g., content provided by a provider or sponsor) that is interspersed within the requested media content. In some embodiments, media content items 404 include songs, podcasts, audiobooks, and/or other audio content. In some embodiments, media content items 404 do not include video content items or other visual media content items. Generally, a media content clip refers to a short media content item that includes music, other vocal content, video content, or any combination thereof. Note that the term "clip," as used herein, is not intended to imply a shortened (or clipped) version of a longer media item, but rather refers to entire media items (e.g., sponsored or informational media items) that are generally short in length. In some embodiments, media content breaks 402 include provided or otherwise sponsored content items and are, in general, shorter in duration than media content items (e.g., a media content break 402 has a shorter duration than a media content item 404). In some embodiments, a media content clip may comprise media content other than that which was requested by the user. Media content breaks 402 are inserted within listening session 400 (e.g., as sponsored content breaks).

As described earlier herein, there is a need to customize the provision of media content breaks 402. Allowing for a more adaptive or otherwise customized provision of media content breaks 402 may in turn improve the quality of media clips provided to the user. In particular, in accordance with the present disclosure, the content, timing, duration, and frequency of media content breaks 402 are dynamically determined while listening session 400 is ongoing. For example, media content breaks 402 should include content that the user may find interesting and/or relevant, they should be delivered at a comfortable frequency (yet frequent enough to satisfy the requirements of a provider such as a sponsor) and should be long enough, but not so long as to reduce the user experience.

As shown in FIG. 4, media content break 402-1 is provided at the beginning of listening session 400 after time t0. In some embodiments, media content break 402-1 is provided as a default to a user after a listening session is initiated. Media content break 402-1 is followed by media content items 404-1 (e.g., three media content items). During each of the media content items 404-1, the server processes a decision, based on one or more characteristics of a listening session at a particular time while a respective media content item 404-1 is playing, whether to deliver a media content clip after the respective media content item ends. In some embodiments, the characteristics include a duration of time since a previously provided media content clip was last provided. In some embodiments, the characteristics are selected from movement of the electronic device, a foreground status of a user interface associated with the media-providing service, a genre associated with the listening session of the user, the user's frequency of skipping media content clips, the user's account parameters, the user's streaming history, and the user's interaction with the electronic device. In some embodiments, the one or more characteristics are used to predict, for example using machine learning, a length of time remaining in the listening session of the user and/or a likelihood that the user will interact with the media content clip. Such predictions are then used for determining whether to provide a media content clip after a respective media content item of media content items 404-1 has ended. When a determination is made to provide a media content clip, the server delivers a media content clip. When a determination is made not to provide a media content clip, the server forgoes delivering a media content clip.

In FIG. 4, three media content items 404-1 are streamed sequentially before a determination is made, based on the one or more characteristics of listening session 400, that a media content clip should be played (e.g., the listening session is interrupted with an sponsored content break). The determination to deliver the media content break (e.g., media content break 402-2) is made during provision of the third media content item of media content items 404-1. In some embodiments, a media content break 402 includes a single media content clip (e.g., media content break 402-1 includes a single media content clip). In some embodiments, media content break 402 includes two or more media content clips (e.g., media content break 402-2 includes three media content clips). For example, each of the media content clips in media content break 402-2 corresponds to an individual sponsored content item. In some embodiments, when a determination is made to provide a media content clip, a determination of a duration of the respective media content clip and/or a number of media content clips is also made. In some embodiments, when a determination is made to provide a media content clip, a determination or a selection of content included in the respective media content clip is also made. After streaming of media content break 402-2, listening session 400 continues by streaming of media content items 404-2 on the user's device. In FIG. 4, media content items 404-2 include four items that are streamed sequentially. As described above, during each of the media content items 404-2, the server processes a decision, based on one or more characteristics of the listening session at a particular time while a respective media content item 404-2 is playing, whether to deliver a media content clip after the respective media content item ends. In FIG. 4, a determination to deliver a media content break (e.g., media content break 402-3 including two media content clips) is made during provision of the fourth media content item of media content items 404-2.

As illustrated in FIG. 4, the present disclosure provides for methods and systems for dynamically delivering additional media content clips to a user's electronic device while the user is listening to media content items. In turn, the dynamic delivery may improve the user's enjoyment of the listening experience by adapting or otherwise customizing the duration, frequency, and number of media content clips to be delivered based on characteristics of the ongoing listening session.

Figure 5:
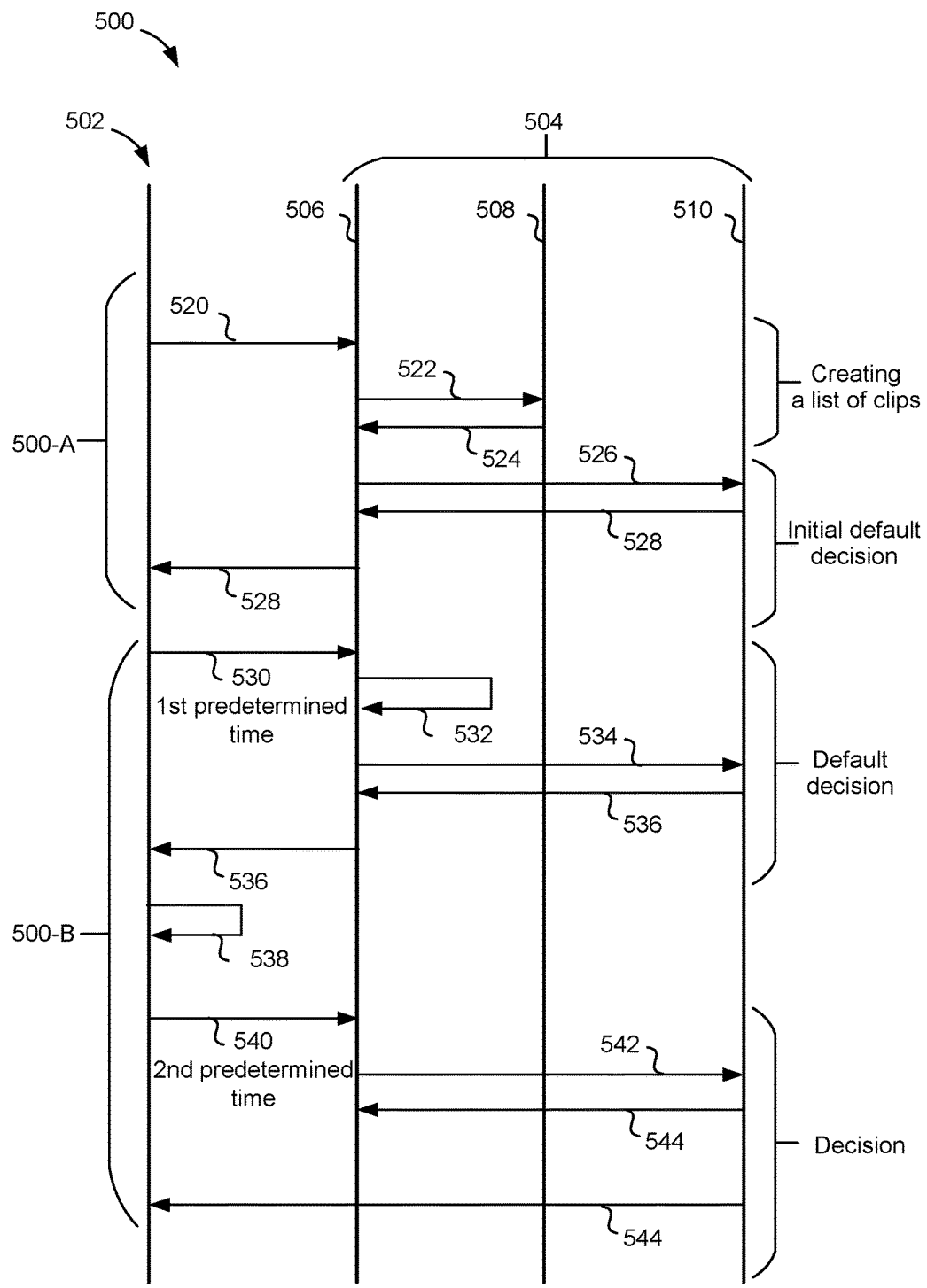
FIG. 5 is a diagram illustrating a procedure for dynamically providing additional media content clips in a listening session, in accordance with some embodiments.
Figure 6B:
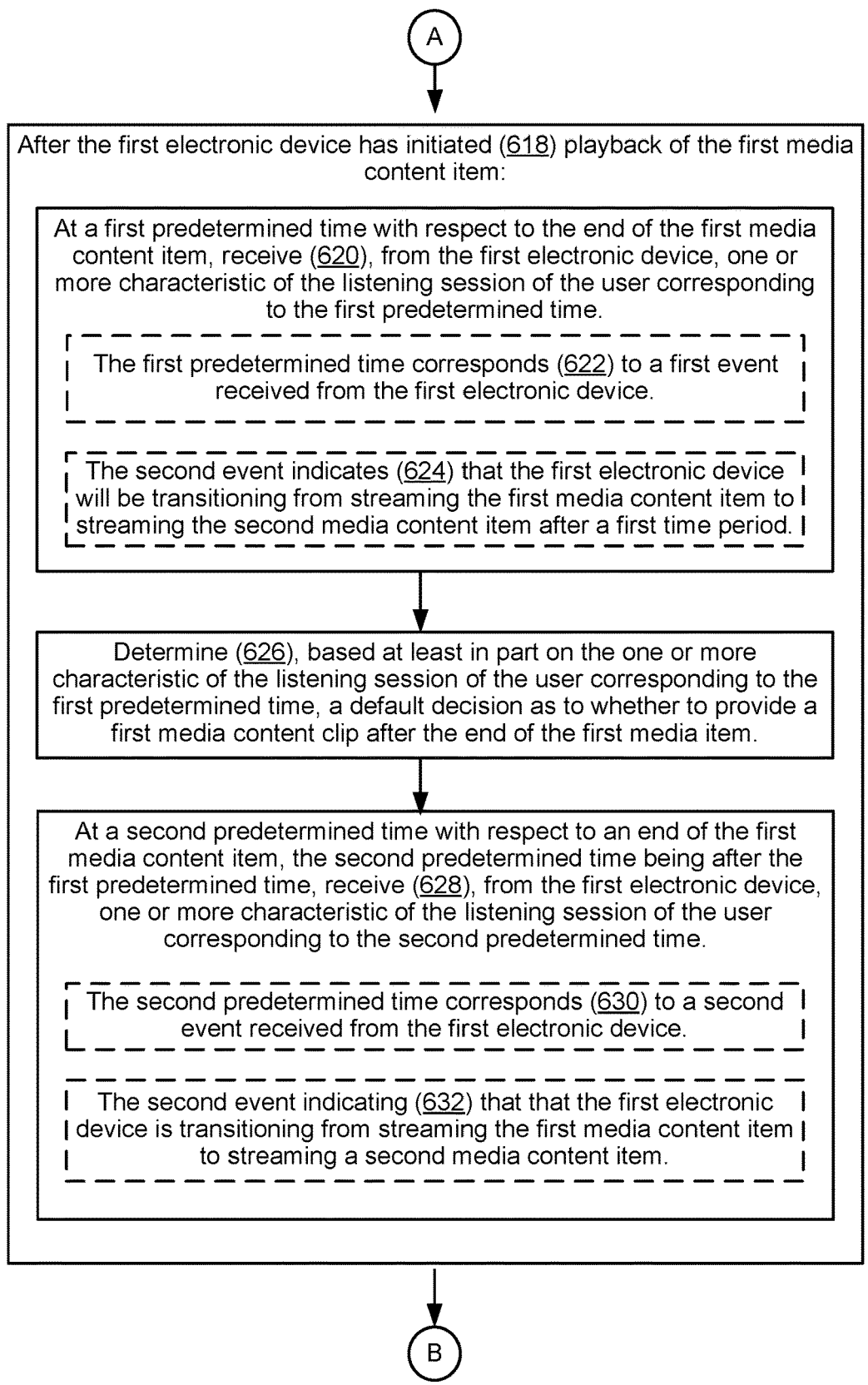
Figure 6C:
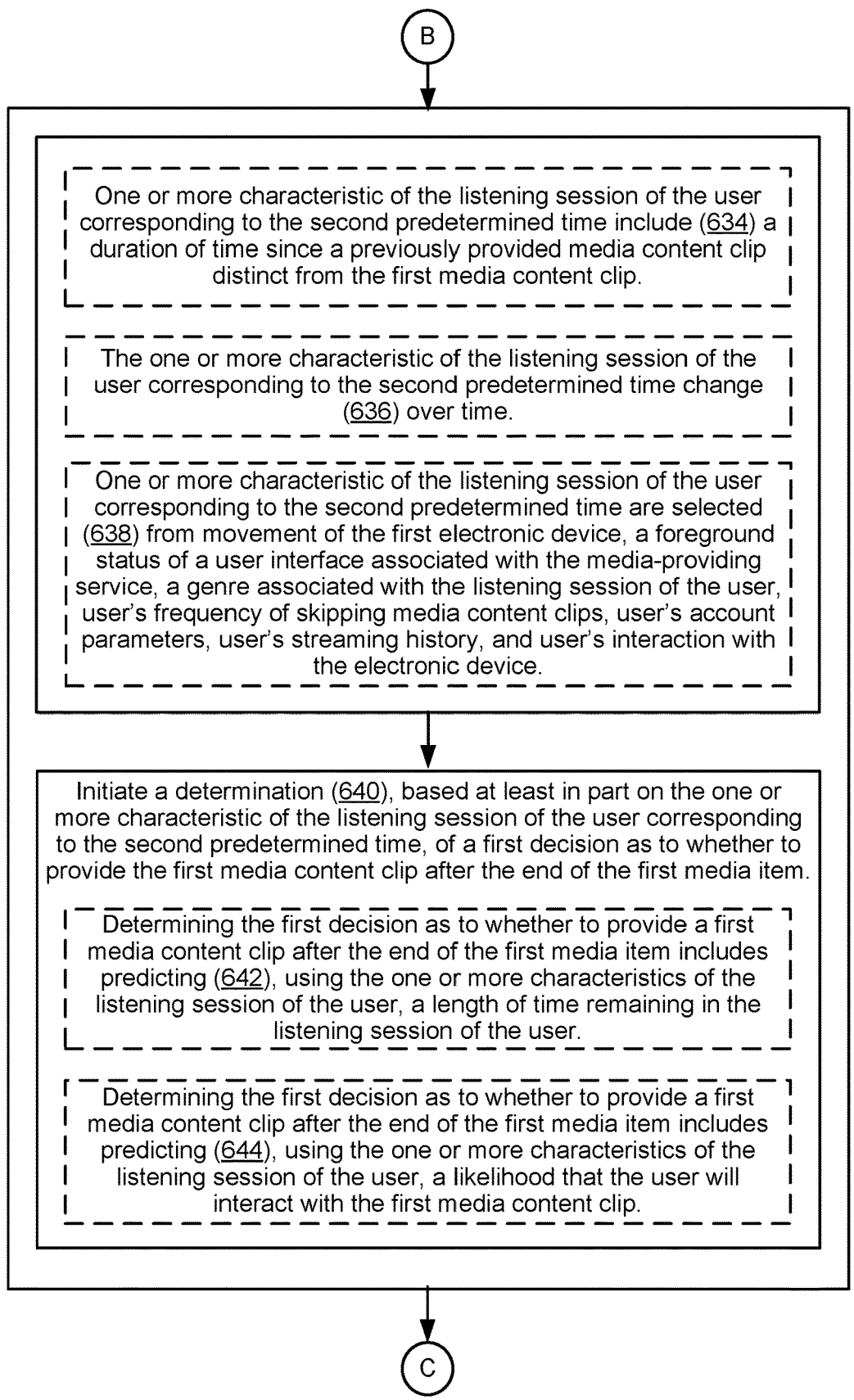
Figure 6D:
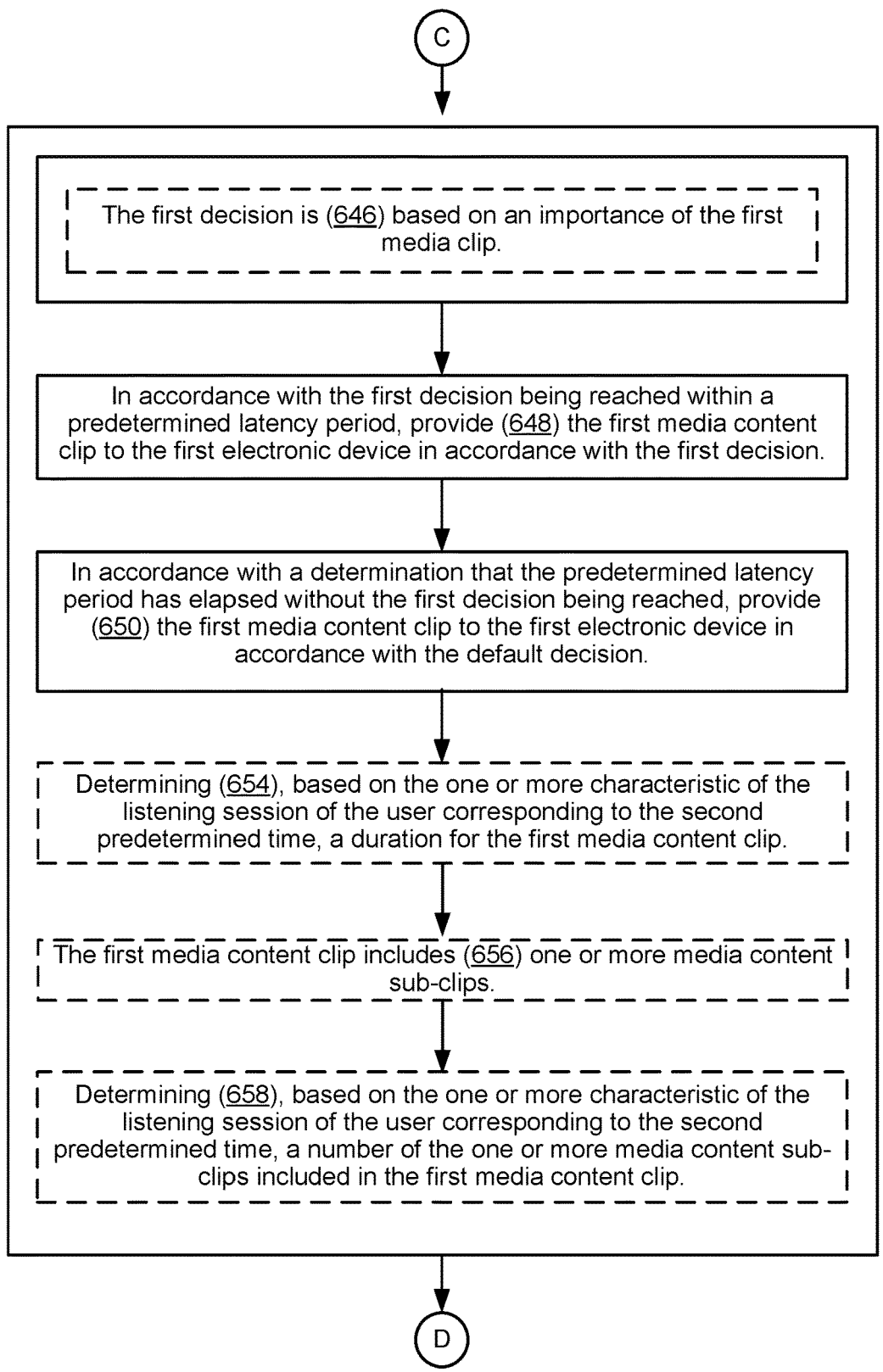
Figure 6E:
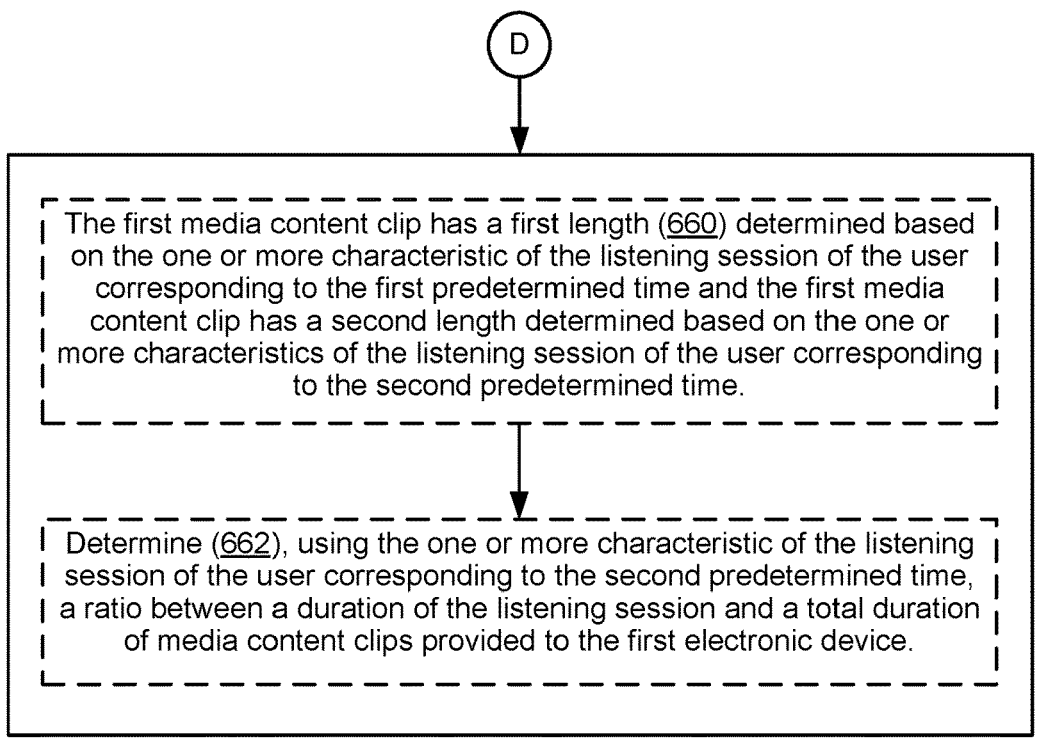

FIG. 5 is a diagram illustrating method 500 for dynamically providing media content clips in a listening session, in accordance with some embodiments. FIG. 5 illustrates a wireless communication between user device 502 (e.g., electronic device 102 described above with respect to FIG. 2) and server 504 (e.g., media content server 104 described with respect to FIG. 3). Server 504 includes a plurality of modules in interaction with each other. The modules facilitate communication and data processing with regard to dynamically providing media content clips. Module 506 is configured to facilitate communication between user device 502 and server 504 for delivering media content clips to user device 502. In some embodiments, module 506 corresponds to clip content request module 318 described above with respect to FIG. 3. In particular, module 506 receives data from user device 502 and returns decisions regarding media content clips to be provided by server 504 to user device 502. Module 508 is configured to facilitate fetching a list of media content clips to be provided to user device 502. In some embodiments, module 508 corresponds to clip content module 320 described above with respect to FIG. 3. Module 510 includes one or more machine learning (ML) systems configured to analyze data received from user device 502 in order to decide when to deliver media content clips to user device 502.

As shown illustrated in FIG. 5, server 504 includes separate modules for fetching (e.g., module 508) media content clips and deciding (e.g., module 510) when to provide media content clips to user device 502. Such separation enables server 504 to analyze a user's status and behavior in substantially real-time by one module while fetching the media content item to be delivered by another module. The separation thereby makes the process very fast and the decisions made reflect rapidly changing status and/or behavior of the user of user device 502. For example, server 504 is able to adjust decisions on delivering media content clips in a span of a few seconds or fractions of a second. Examples of change of status and a user's behavior include the user's movements, change of position of user device 502, change of a foreground application displayed on user device 502, and a user's interaction with user device 502.

In some embodiments, method 500 includes first portion 500-A during which media content clips are pre-fetched to be delivered to user device 502, and an initial default decision on delivering a first media content clip is determined. In some embodiments, first portion 500-A of method 500 is performed right after a user has initiated a listening session. For example, first portion 500-A is initiated when a user opens an application on user device 502 associated with server 504 (e.g., before a first media content item of the listening session is provided). In some embodiments, first portion 500-A is performed while a first media content item of the listening session is being provided by server 504 for playback on user device 502. Method 500 further includes second portion 500-B during which iterative steps for dynamically determining default decisions and dynamic decisions for delivering media content clips to user device 502 are made. In some embodiments, second portion 500-B is performed while a respective media content item of the listening session is being provided to user device 502 for playback. In some embodiments, second portion 500-B is performed during each media content item of the listening session.

For example, referring to FIG. 4, listening session 400 includes three media content items 404-1 and four media content items 404-2 that are provided sequentially to a user device during listening session 400. First portion 500-A is performed at the beginning of listening session 400. In some embodiments, first portion 500-A is performed at time t0 (e.g., just as the user is initiating listening session 400). In some embodiments, first portion 500-A is performed during the streaming of a first media content item of media content items 404-1. Second portion 500-B is repeated during playback of each of the media content items 404 of listening session 400. For example, second portion 500-B is repeated during playback of a first media content item, a second media content item, and a third media content item of media content items 404-1 and during playback of a first media content item, a second media content item, a third media content item, and a fourth media content item of media content items 404-2.

In some embodiments, method 500 is initiated by event 520 received by module 506 of server 504 from user device 502. In some embodiments, event 520 is triggered when a user initiates a listening session on user device 502. At the time of event 520, no media content clips are pre-fetched for user device 502. In response to receiving event 520, module 506 sends request 522 to module 508 for pre-fetching a list of media content clips. Pre-fetching refers to obtaining and organizing a set of media content clips into a sequential list of media content clips to be provided to user device 502. In accordance with event 520, module 508 returns list of media content clips 524 to module 506. In some embodiments, event 520 includes providing server 504 one or more initial characteristics and/or parameters associated with the user of user device 502. In some embodiments, the one or more initial characteristics and/or parameters associated with user device 502 include information that is not related to the listening session but rather information of the user's background, prior behavior, and/or the user's streaming history associated to the media content provider.

In some embodiments, list of media content clips 524 includes a plurality of media content clips to be provided to user device 502 in a particular order. As explained above, a media content clip refers to a short media content item that includes music, vocal content, video content, or any combination thereof. In some embodiments, a media content break includes a single media content clip. In some embodiments, a media content break includes two or more media content clips. In some embodiments, media content clips include sponsored content or informational content.

In some embodiments, list of media content clips 524 is associated with the user of user device 502 so that the content and/or order of the clips in list of media content clips 524 is customized to characteristics or parameters indicative of the user's interests and needs. In some embodiments, the evaluation of the user's interests and needs is done based on certain parameters, including the user's demographic information (e.g., age, gender, location, occupation, etc.), account information, prior streaming behavior, and/or other parameters that may be used as an indication of user's interests or needs. In some embodiments, the order of media content clips in list of media content clips 524 is determined at least partially on the user's interest and needs. In some embodiments, list of media content clips 524 is updated (e.g., modified) periodically while providing media content items to user device 502. In some embodiments, list of media content clips 524 is updated every 10 seconds, every 15 seconds, every 20 seconds, every 25 seconds, or every 30 seconds. In some embodiments, list of media content clips 524 is updated at the beginning of provision of each media content item. In some embodiments, the updating includes adding and/or removing media content clips from list of media content clips 524 and/or changing the order of the media content clips in list of media content clips 524.

In some embodiments, the order of media content clips in list of media content clips 524 is determined based on an importance of the media content clips.

In some embodiments, each media content clip has a duration less than or equal to 5 seconds, less than or equal to 10 seconds, less than or equal to 15 seconds, less than or equal to 20 seconds, less than or equal to 25 seconds, less than or equal to 30 seconds, less than or equal to 35 seconds, less than or equal to 40 seconds, less than or equal to 45 seconds, or less than or equal to 60 seconds. In some embodiments, a media content clip has a duration longer than 60 seconds. In some embodiments, media content clips included in list of media content clips 524 are configured to be delivered to user device 502 sequentially (e.g., in the order of the list). For example, a first media content clip is delivered first, a second media content clip is delivered second, a third media content clip is delivered third, etc. In some embodiments, media content clips included in list of media content clips 524 are provided in the order of the list, but certain media content clips may be skipped (e.g., only the second, fifth, and sixth media content clips in the list are rendered, or only the third, fourth and fifth media content clips in the list are rendered). In some embodiments, media content clips included in list of media content clips 524 are configured to be delivered to user device 502 in a randomized order (e.g., the second media content clip is delivered first, a fourth media content clip is delivered second, etc.) In some embodiments, the first, second, and third media content clips have distinct content (e.g., user device 502 receives sponsored content with different contents). In some embodiments, the first, second, and third media content clips have unique durations (e.g., the first media content clip is longer than the second and third media content clips). In some embodiments, list of media content clips 524 includes media content clips having a total duration of up to 200 seconds, up to 180 seconds, up to 160 seconds, up to 140 seconds, up to 120 seconds, or up to 1000 seconds.

Module 508 sends request 526 to module 510 for processing an initial default decision on whether to provide a media content clip to user device 502 after a respective media content item ends. In some embodiments, an initial default decision is determined by module 510 in response to request 526. The initial default decision is determined based on one or more characteristics associated with the user's streaming history. In some embodiments, the initial default decision does not reflect the characteristics of the ongoing listening session but rather reflects characteristics of the user's prior listening sessions. For example, the default decision is determined based on a typical length of the user's listening sessions and/or typical movement of user device 502 during a listening session. In some embodiments, the initial default decision does reflect the characteristics of the ongoing listening session but is performed prior to the "real-time" decision described below, and is thus not as up-to-date as the real-time decision. Module 510 returns initial default decision 528 regarding when to deliver a media content clip to user device 502 to module 506. Module 506 further communicates initial default decision 528 to user device 502.

Second portion 500-B of method 500 is performed after first portion 500-A. Namely, after first portion 500-A, list of media content clips 524 has been pre-fetched and initial default decision 528 on whether to provide a first media content item from list of media content items 524 to user device 502 has been made. Second portion 500-B of method 500 is performed while a respective media content item of the listening session is being provided to user device 502. Second portion 500-B is repeated during each media content item of the listening session (e.g., during each media content item 404 of listening session 400 in FIG. 4).

In some embodiments, second portion 500-B of method 500 is initiated by receiving data 530 by module 506 of server 504 from user device 502 while a respective media content item (e.g., a first media content item, a second media content item, a third media content item of the listening session, etc.) is being provided to user device 502 for playback. Data 530 is received at a first predetermined time (e.g., relative to an end of the respective media content item). In some embodiments, the first predetermined time corresponds to a time when user device 502 is approaching an end of the respective media content item that is being streamed (e.g., the first media content item) and transitioning to streaming a next media content item (e.g., a second media content item). In some embodiments, the first predetermined time is defined with respect to an end of the respective media content item. In some embodiments, the first predetermined time refers to a time point that is at least 3 seconds, at least 5 seconds, at least 7 seconds, at least 10 seconds, or at least 15 seconds before the end of the respective media content item. In some embodiments, the first predetermined time refers to a time point that is no more than 1 second, no more than 3 seconds, no more than 5 seconds, no more than 7 seconds, no more than 10 seconds, or no more than 15 seconds before the end of the respective media content item. In some embodiments, the first predetermined time is 5 seconds before the end of the respective media content item. The first predetermined time should provide a sufficiently long time period for server 504 to perform a determination of a default decision on whether to provide a media content clip to user device 502 prior to the end of the respective media content item. The first predetermined time should also be as close to the end of the respective media content item as possible so that the default decision reflects the circumstances of the user close to the end of the respective media content item.

Data 530 includes one or more characteristics associated with the listening session at the first predetermined time. In some embodiments, the one or more characteristics include characteristics of the listening session that change over time (e.g., the one or more characteristics are dynamic in nature). In some embodiments, the one or more characteristics include a duration of time since a previously provided media content clip has been provided to user device 502. In some embodiments, the one or more characteristics are selected from movement of user device 502, a foreground status of user device 502, a genre of the music included in listening session, the user's frequency of skipping media content clips during the listening session, user's account parameters, user's streaming history, and user's interaction with user device 502. In some embodiments, the user's account parameters and streaming history include information provided by the user to the media content provider (e.g., demographic information) as well as information about media content items that the user has streamed historically. In some embodiments, the one or more characteristics include frequency and/or type of interaction (e.g., is the user interacting with user device 502 via a touch contact or an audio command). Receiving data 530 triggers event 532 by module 506 which then sends request 534 to module 510. Module 510 analyzes data 530 including the one or more characteristics associated with the listening session at the first predetermined time and determines a default decision on whether a media content clip should or should not be provided to user device 502 after the end of the respective media content item. In some embodiments, as part of determining the default decision, module 510 determines, using the one or more characteristics associated with the listening session at the first predetermined time, a ratio between a duration of the listening session and a total duration of media content clips that have been provided to user device 502 at the first predetermined time. In some embodiments, the ratio is applied for predicting the user's behavior during the listening session. In some embodiments, the analysis includes predicting, based on data 530, a length of time remaining in the listening session of the user. In some embodiments, the analysis includes predicting, based on data 530, a likelihood that the user of user device 502 will interact with the media content clip. For example, when data 530 indicates that user device 502 is moving in a manner consistent with the user walking, bicycling, or driving a car and the user's interaction with user device 502 is thus limited, module 510 predicts that the likelihood that the user would interact with the media content clip is low. Similarly, when data 530 indicates that the user of user device 502 is actively interacting with user device 502 and that an application associated with server 504 is a foreground application at user device 502, module 510 predicts that the likelihood that the user would interact with the media content clip is high.

In accordance with the analyses performed based on data 530, module 510 returns default decision 536 to module 506 which then transfers decision 536 to user device 502. Default decision 536 indicates whether or not a media content clip should be provided to user device 502 after the end of the respective media content item. In an instance where decision 536 indicates that a media content clip should be provided, the decision further includes a determination of a length of the media content break to be provided, a number of media content clips included in the media content break and/or content of the media content clip(s) to be provided. Default decision 536 overrides initial default decision 528 so that when default decision 536 is reached, initial default decision 528 is no longer to be used.

Event 538 is triggered at a second predetermined time prior to the end of the respective media content item. In some embodiments, the second predetermined time is one second, 750 milliseconds, 500 milliseconds, or 250 milliseconds before the end of the respective media content item. At the second predetermined time, data 540 from user device 502 is received by module 506. Data 540 includes one or more characteristics associated with the listening session at the second predetermined time (i.e., at the time when the respective media content item ends). Data 540 thereby includes an updated version of data 530 (e.g., updated data for the same characteristics) including one or more characteristics of the listening session associated with the first predetermined time. Module 506 transmits request 542 to module 510. Module 510 analyzes data 540 as described above with respect to analyzing data 530. Module 510 then determines, based on data 540, whether to provide user device 502 a media content clip at the second predetermined time. Module 510 returns decision 544 of whether to provide the media content clip to module 506 and/or directly to user device 502.

Decision 544 (e.g., a "real-time" decision as to whether to provide a media content clip), which is based on data 540 at the second predetermined time when the respective media content item ends, provides server 504 the most up-to-date and accurate decision on whether to provide user device 502 a media content clip. The decision reflects most accurately the user's likely perception of the media content item at the end of the respective media content item. However, receiving data 540, analyzing it by module 510, and returning decision 544 has to be performed at a very short time period in order for the user to be able to stream content without interruptions. In an instance where the decision is not performed at a short enough predetermined latency period, server 504 uses default decision 536 instead. In some embodiments, the predetermined latency period is less than or equal to one second, less than or equal to 750 milliseconds, less than or equal to 500 milliseconds, less than or equal to 250 milliseconds, or less than or equal to 100 milliseconds. Therefore, in accordance with decision 544 being reached within a predetermined latency period, a media content item is provided in accordance with decision 544 and in accordance with decision 544 not being reached within the predetermined latency period, a media content item is provided in accordance with default decision 536. In an instance where decision 544 is reached within the predetermined latency period and decision 544 indicates that a first media content clip is to be provided, the first media content clip is provided to user device 502 for playback. In an instance where decision 544 is not reached within the predetermined latency period and default decision 536 indicates that a second media content clip is to be provided, the second media content clip is provided to user device 502 for playback. In an instance that the decision to be applied, either decision 544 or default decision 536, indicates that no media content clip is to be provided, server 504 forgoes providing a media content clip to user device 502 for playback after the end of the respective media content item.

In some instances, default decision 536 is distinct from decision 544. For example, default decision 536 determined based on data 530 indicates that no media content clips should be provided whereas decision 544 indicates that a media content clip should be provided after the respective media content item ends. In some instances, default decision 536 and decision 544 both indicate that a media content clip should be provided after the respective media content item ends. However, default decision 536 may indicate that a media content item having a first set of parameters is to be provided whereas decision 544 may indicate that a media content item having a second set of parameters is to be provided, where the second set of parameters is distinct from the first set of parameters. In some embodiments, the parameters include a duration of a media content break, a number of media content clips included in a media content break and/or content (e.g., selection) of a media content clip. In some embodiments, the duration of the media content clip is selected from a range ranging between 5 seconds and 60 seconds (e.g., a media content clips has a duration of 5 seconds, 10 seconds, 15 seconds, 20 seconds, 25 seconds, 30 seconds, 35 seconds, 40 seconds, 45 seconds, 50 seconds, 55 seconds or 60 seconds). In some embodiments, the media content breaks include one, two, three, or four media content clips. For example, the first media content clip having parameters in accordance with default decision 536 is part of a media content break that has a first duration and includes two media content clips whereas the second media content clip having parameters in accordance with decision 544 is part of a second media content break that has a second duration that is longer than the first duration. The second media content break includes three media content clips.

FIGS. 6A-6E are flow diagrams illustrating method 600 for providing a user media content clips dynamically, in accordance with some embodiments. Method 600 may be performed (602) at a server system (e.g., media content server 104, FIGS. 1 and 3) having one or more processors and memory storing instructions for execution by the one or more processors. In some embodiments, the server system is associated with a media-providing service (e.g., provides media content for playback to client devices 102 in a media content delivery system 100, and/or executes an application for the media-providing service). In some embodiments, the method 600 is performed by executing instructions stored in the memory of a server system (e.g., in memory 306, FIG. 3). In some embodiments, the method 600 is performed by a combination of the server system and a client device.

Method 600 includes providing (604), to a first electronic device corresponding to (e.g., associated with) a user of the media-providing service, a first media content item for playback. The first media content item is included (606) in a listening session of the user. For example, listening session 400 includes a plurality of media content items in FIG. 4. The plurality of media content items include a first media content item (e.g., a first media content item provided after t0). Listening session 400 is provided by media content server 104 to an electronic device associated with a first user (e.g., electronic device 102-1) in FIG. 1.

In some embodiments, the listening session of the user includes (608) a first set of media content items provided to the first electronic device sequentially (e.g., media content items 404 are provided sequentially in FIG. 4). For example, providing media content items sequentially refers to providing the media content items one after another. The order in which the media content items are provided is not necessarily predetermined and may dynamically change during the listening session. In some embodiments, the first set of media content items includes (610) audio content items. In some embodiments, the audio content items include songs, podcasts, audiobooks, or any combination thereof. For example, the media content items include songs and do not include video content items.

In some embodiments, method 600 includes creating (612), while providing the playback of the first media content item, a list of media content clips including the first media content clip and the second media content clip. For example, module 508 of server 504 creates list of media content clips 524 to be provided to user device 502 in FIG. 5. In some embodiments, the media content items included in list of media content clips 524 have a total duration of up to 200 seconds, up to 180 seconds, up to 160 seconds, up to 140 seconds, up to 120 seconds, or up to 1000 seconds. In some embodiments, the list of media content clips is associated with (614) the user and the list of media content clips includes media content clips to be provided to the first electronic device in a particular order. For example, list of media content clips 524 is customized to the user of user device 502. Creating (612) the list of media content items is performed prior to a first predetermined time when a default decision on whether a media content clip should be provided to the electronic device after the first media content item ends.

In some embodiments, method 600 includes updating (616) the list of media content clips periodically while providing the playback of the first media content item. For example, the updating includes adding and/or removing media content clips from the list and changing the order of the media content items on the list. For example, the updating occurs every 10 seconds, 15 seconds, 20 seconds, etc.

After the first electronic device has initiated (618) playback of the first media content item, method 600 includes, at a first predetermined time with respect to the end of the first media content item, receiving (620), from the first electronic device, one or more characteristic of the listening session of the user corresponding to (e.g., associated with) the first predetermined time. For example, module 506 of server 504 receives data 530 from user device 502 in FIG. 5. Data 530 is received at the first predetermined time and receiving data 530 triggers event 532 by module 506 which then sends request 534 to module 510.

In some embodiments, the first predetermined time corresponds (622) to (e.g., is associated with) a first event received from the first electronic device (e.g., the first event corresponds to receiving data 530 in FIG. 5). In some embodiments, the first event indicates (624) that the first electronic device will be transitioning from streaming the first media content item to streaming the second media content item after a first time period. In some embodiments, the first time period is at least 3 seconds, at least 5 seconds, at least 7 seconds, at least 10 seconds, or at least 15 seconds before the end of the respective media content item. For example, the first time period is 5 seconds. In some embodiments, the first media content item and the second media content item are included in the first set of media content items (e.g., the first set of media content items includes media content items 404 in listening session 400 of FIG. 4). In some embodiments, the one or more characteristics of the listening session of the user corresponding to the first predetermined time include a duration of time since a previously provided media content clip distinct from the first media content clip (e.g., a duration of time between media content break 402-1 and a respective media content break 402-2 in FIG. 4).

In some embodiments, the one or more characteristics of the listening session of the user corresponding to the first predetermined time change over time. In some embodiments, the one or more characteristic of the listening session of the user corresponding to the first predetermined time are selected from movement of the first electronic device, a foreground status of a user interface associated with the media-providing service, a genre associated with the listening session of the user, user's frequency of skipping media content clips, user's account parameters, user's streaming history, and user's interaction with the electronic device.

Method 600 includes, determining (626), based at least in part on the one or more characteristic of the listening session of the user corresponding to the first predetermined time, a default decision as to whether to provide a first media content clip after the end of the first media item. For example, module 510 analyzes data 530 and determines, at least in part on the one or more characteristics of data included in data 530, default decision 536 as to whether to provide a first media content clip after the end of the first media item in FIG. 5.

Method 600 includes, at a second predetermined time with respect to an end of the first media content item (e.g., upon completion of the first media content item), the second predetermined time being after the first predetermined time, receiving (628), from the first electronic device, one or more characteristic of the listening session of the user corresponding to the second predetermined time. For example, module 506 of server 504 receives data 540 from user device 502 in FIG. 5. Data 540 includes one or more characteristics of the listening session at the second predetermined time. In some embodiments, the second predetermined time corresponds (630) to a second event received from the first electronic device (e.g., the event corresponding to module 506 receiving data 540 from user device 502). In some embodiments, the second event indicates (632) that the first electronic device is transitioning from streaming the first media content item to streaming a second media content item.

In some embodiments, one or more characteristics of the listening session of the user corresponding to the second predetermined time include (634) a duration of time since a previously provided media content clip distinct from the first media content clip was provided (e.g., a duration of time between media content break 402-1 and media content break 402-2 in FIG. 4).

In some embodiments, the one or more characteristics of the listening session of the user corresponds to the second predetermined time change (636) over time. In some embodiments, the one or more characteristic of the listening session of the user corresponding to the second predetermined time are selected (638) from movement of the first electronic device, a foreground status of a user interface associated with the media-providing service, a genre associated with the listening session of the user, user's frequency of skipping media content clips, user's account parameters, user's streaming history, and user's interaction with the electronic device.

Method 600 includes initiating a determination (640), based at least in part on the one or more characteristic of the listening session of the user corresponding to the second predetermined time, of a first decision (e.g., decision 544 determined by module 510 in FIG. 5) as to whether to provide the first media content clip after the end of the first media item.

In some embodiments, determining the first decision as to whether to provide a first media content clip after the end of the first media item includes predicting (642), using the one or more characteristics of the listening session of the user, a length of time remaining in the listening session of the user. In some embodiments, determining the first decision as to whether to provide a first media content clip after the end of the first media item includes predicting (644), using the one or more characteristics of the listening session of the user, a likelihood that the user will interact with the first media content clip. In some embodiments, the first decision is (646) based on an importance of the first media clip.

Method 600 includes, in accordance with the first decision being reached within a predetermined latency period, providing (648) the first media content clip to the first electronic device in accordance with the first decision. For example, if module 510 provides decision 544 within the predetermined latency period, a media content clip is provided to user device 502 in accordance with decision 544. Method 600 also includes, in accordance with a determination that the predetermined latency period has elapsed without the first decision being reached, providing (650) the first media content clip to the first electronic device in accordance with the default decision. For example, if module 510 does not provide decision 544 within the predetermined latency period, a media content clip is provided to user device 502 in accordance with default decision 536.

In some embodiments, in accordance with a determination not to provide the first media content clip after the end of the first media content item, forgoing (652) providing the first media content clip to the first electronic device after the end of the first media content item. For example, in an instance that decision 536 or decision 544, whichever is to be used based on the determination whether the latency period has elapsed, indicates not to provide a media content clip after the end of the first media content item, no media content item clip is provided to user device 502 in FIG. 5.

In some embodiments, determining (654), based on the one or more characteristics of the listening session of the user corresponding to the second predetermined time, a duration for the first media content clip. In some embodiments, the first media content clip is (656) part of a media content break that includes a plurality of media content clips. In some embodiments, determining (658), based on the one or more characteristics of the listening session of the user corresponding to the second predetermined time, a number of the plurality of media content clips to include in the media content break.

In some embodiments, the first media content clip has a first length (660) determined based on the one or more characteristic of the listening session of the user corresponding to the first predetermined time and the first media content clip has a second length determined based on the one or more characteristics of the listening session of the user corresponding to the second predetermined time. In some embodiments, the second length is different from the first length. For example, the first length is 30 seconds and the second length is 15 seconds.

In some embodiments, determining (662), using the one or more characteristic of the listening session of the user corresponding to the second predetermined time, a ratio between a duration of the listening session and a total duration of media content clips provided to the first electronic device. In some embodiments, the ratio between the duration of the listening session and the total duration of media content clips provided is used in determining the first decision (e.g., decision 544) or the default decision (e.g., default decision 536).

Although FIGS. 6A-6E illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at a server system associated with a media-providing service, the server system having one or more processors and memory storing instructions for execution by the one or more processors:
providing, to a first electronic device corresponding to a user of the media-providing service, a first media content item for playback, wherein the first media content item is included in a listening session of the user;
after the first electronic device has initiated playback of the first media content item, and before completion of the first media content item, without user intervention:
at a first predetermined time with respect to the end of the first media content item, receiving, from the first electronic device, one or more characteristics of the listening session of the user corresponding to the first predetermined time;
determining, based at least in part on the one or more characteristics of the listening session of the user corresponding to the first predetermined time, a default decision as to whether to provide a first media content clip after the end of the first media content item;
at a second predetermined time prior to an end of the first media content item and before transitioning to a second media content item, wherein the second predetermined time is after the first predetermined time, receiving, from the first electronic device, one or more characteristics of the listening session of the user corresponding to the second predetermined time, wherein the one or more characteristics of the listening session of the user corresponding to the second predetermined time comprise a characteristic selected from a group consisting of:
movement of the first electronic device,
a foreground status of a user interface associated with the media-providing service,
a genre associated with the listening session of the user,
a frequency of the user skipping media content clips,
account parameters of the user,
a streaming history of the user, and
interaction by the user with the first electronic device;
initiating a determination, based at least in part on the one or more characteristics of the listening session of the user corresponding to the second predetermined time, of a first decision as to whether to provide the first media content clip after the end of the first media content item;
in accordance with the first decision being reached within a predetermined latency period, providing the first media content clip to the first electronic device in accordance with the first decision; and
in accordance with a determination that the predetermined latency period has elapsed without the first decision being reached, providing the first media content clip to the first electronic device in accordance with the default decision.

2. The method of claim 1, further comprising, in accordance with a determination not to provide the first media content clip after the end of the first media content item, forgoing providing the first media content clip to the first electronic device after the end of the first media content item.

3. The method of claim 1, further comprising:
creating, while providing the playback of the first media content item, a list of media content clips including the first media content clip, wherein:
the list of media content clips is associated with the user; and
the list of media content clips includes media content clips to be provided to the first electronic device in a particular order.

4. The method of claim 3, further including updating the list of media content clips periodically while providing the playback of the first media content item.

5. The method of claim 1, wherein the first media content item is an audio content item.

6. The method of claim 1, wherein the second predetermined time corresponds to a second event received from the first electronic device, the second event indicating that the first electronic device is transitioning from streaming the first media content item to streaming the second media content item.

7. The method of claim 1, wherein the first predetermined time corresponds to a first event received from the first electronic device, the first event indicating that the first electronic device will be transitioning from streaming the first media content item to streaming the second media content item after a first time period.

8. The method of claim 1, wherein determining the first decision as to whether to provide a first media content clip after the end of the first media content item includes predicting, using the one or more characteristics of the listening session of the user, a length of time remaining in the listening session of the user.

9. The method of claim 1, wherein determining the first decision as to whether to provide a first media content clip after the end of the first media content item includes predicting, using the one or more characteristics of the listening session of the user, a likelihood that the user will interact with the first media content clip.

10. The method of claim 1, further comprising:
determining, based on the one or more characteristics of the listening session of the user corresponding to the second predetermined time, a duration for the first media content clip.

11. The method of claim 1, wherein the first media content clip is part of a media content break that includes a plurality of media content clips.

12. The method of claim 11, further comprising, determining, based on the one or more characteristics of the listening session of the user corresponding to the second predetermined time, a number of the plurality of media content clips to include in the media content break.

13. The method of claim 1, wherein the first media content clip has a first length determined based on the one or more characteristics of the listening session of the user corresponding to the first predetermined time and the first media content clip has a second length determined based on the one or more characteristics of the listening session of the user corresponding to the second predetermined time.

14. The method of claim 1, further comprising:
determining, using the one or more characteristics of the listening session of the user corresponding to the second predetermined time, a ratio between a duration of the listening session and a total duration of media content clips provided to the first electronic device.

15. The method of claim 1, wherein the one or more characteristics of the listening session of the user corresponding to the second predetermined time include a duration of time since a previously provided media content clip distinct from the first media content clip.

16. The method of claim 1, wherein the one or more characteristics of the listening session of the user corresponding to the second predetermined time change over time.

17. The method of claim 1, wherein the first decision is based on an importance of the first media content clip.

18. A server system of a media-providing service, the server system having one or more processors and memory storing instructions for execution by the one or more processors, the instructions including instructions for:
providing, to a first electronic device corresponding to a user of the media-providing service, a first media content item for playback, wherein the first media content item is included in a listening session of the user;
after the first electronic device has initiated playback of the first media content item, and before completion of the first media content item, without user intervention:
at a first predetermined time with respect to the end of the first media content item, receiving, from the first electronic device, one or more characteristics of the listening session of the user corresponding to the first predetermined time;
determining, based at least in part on the one or more characteristics of the listening session of the user corresponding to the first predetermined time, a default decision as to whether to provide a first media content clip after the end of the first media content item;
at a second predetermined time prior to an end of the first media content item and before transitioning to a second media content item, wherein the second predetermined time is after the first predetermined time, receiving, from the first electronic device, one or more characteristics of the listening session of the user corresponding to the second predetermined time, wherein the one or more characteristics of the listening session of the user corresponding to the second predetermined time comprise a characteristic selected from a group consisting of:
movement of the first electronic device,
a foreground status of a user interface associated with the media-providing service,
a genre associated with the listening session of the user,
a frequency of the user skipping media content clips,
account parameters of the user,
a streaming history of the user, and
interaction by the user with the first electronic device;
initiating a determination, based at least in part on the one or more characteristics of the listening session of the user corresponding to the second predetermined time, of a first decision as to whether to provide the first media content clip after the end of the first media content item;
in accordance with the first decision being reached within a predetermined latency period, providing the first media content clip to the first electronic device in accordance with the first decision; and
in accordance with a determination that the predetermined latency period has elapsed without the first decision being reached, providing the first media content clip to the first electronic device in accordance with the default decision.

19. A non-transitory computer-readable storage medium storing instructions that, when executed by a server system of a media-providing service, cause the server system to:
provide, to a first electronic device corresponding to a user of the media-providing service, a first media content item for playback, wherein the first media content item is included in a listening session of the user;
after the first electronic device has initiated playback of the first media content item, and before completion of the first media content item, without user intervention:
at a first predetermined time with respect to the end of the first media content item, receive, from the first electronic device, one or more characteristics of the listening session of the user corresponding to the first predetermined time;
determine, based at least in part on the one or more characteristics of the listening session of the user corresponding to the first predetermined time, a default decision as to whether to provide a first media content clip after the end of the first media content item;
at a second predetermined time prior to an end of the first media content item and before transitioning to a second media content item, wherein the second predetermined time is after the first predetermined time, receive, from the first electronic device, one or more characteristics of the listening session of the user corresponding to the second predetermined time, wherein the one or more characteristics of the listening session of the user corresponding to the second predetermined time comprise a characteristic selected from a group consisting of:
movement of the first electronic device,
a foreground status of a user interface associated with the media-providing service,
a genre associated with the listening session of the user,
a frequency of the user skipping media content clips,
account parameters of the user,
a streaming history of the user, and
interaction by the user with the first electronic device;
initiate a determination, based at least in part on the one or more characteristics of the listening session of the user corresponding to the second predetermined time, of a first decision as to whether to provide the first media content clip after the end of the first media content item;

in accordance with the first decision being reached within a predetermined latency period, provide the first media content clip to the first electronic device in accordance with the first decision; and in accordance with a determination that the predetermined latency period has elapsed without the first decision being reached, provide the first media content clip to the first electronic device in accordance with the default decision.

* * * * *